(No Model.) 6 Sheets—Sheet 1.
R. SCHLEICHER.
WOODWORKING MACHINE.

No. 569,940. Patented Oct. 20, 1896.

Witnesses:
CC Burdine.
D. E. Burdine.

Inventor:
Robert Schleicher,
by Dodge and Sons,
Attorneys.

(No Model.) 6 Sheets—Sheet 2.

R. SCHLEICHER.
WOODWORKING MACHINE.

No. 569,940. Patented Oct. 20, 1896.

Witnesses:
C. C. Budine
D. E. Budine

Inventor:
Robert Schleicher,
by Dodge & Sons,
Attorneys

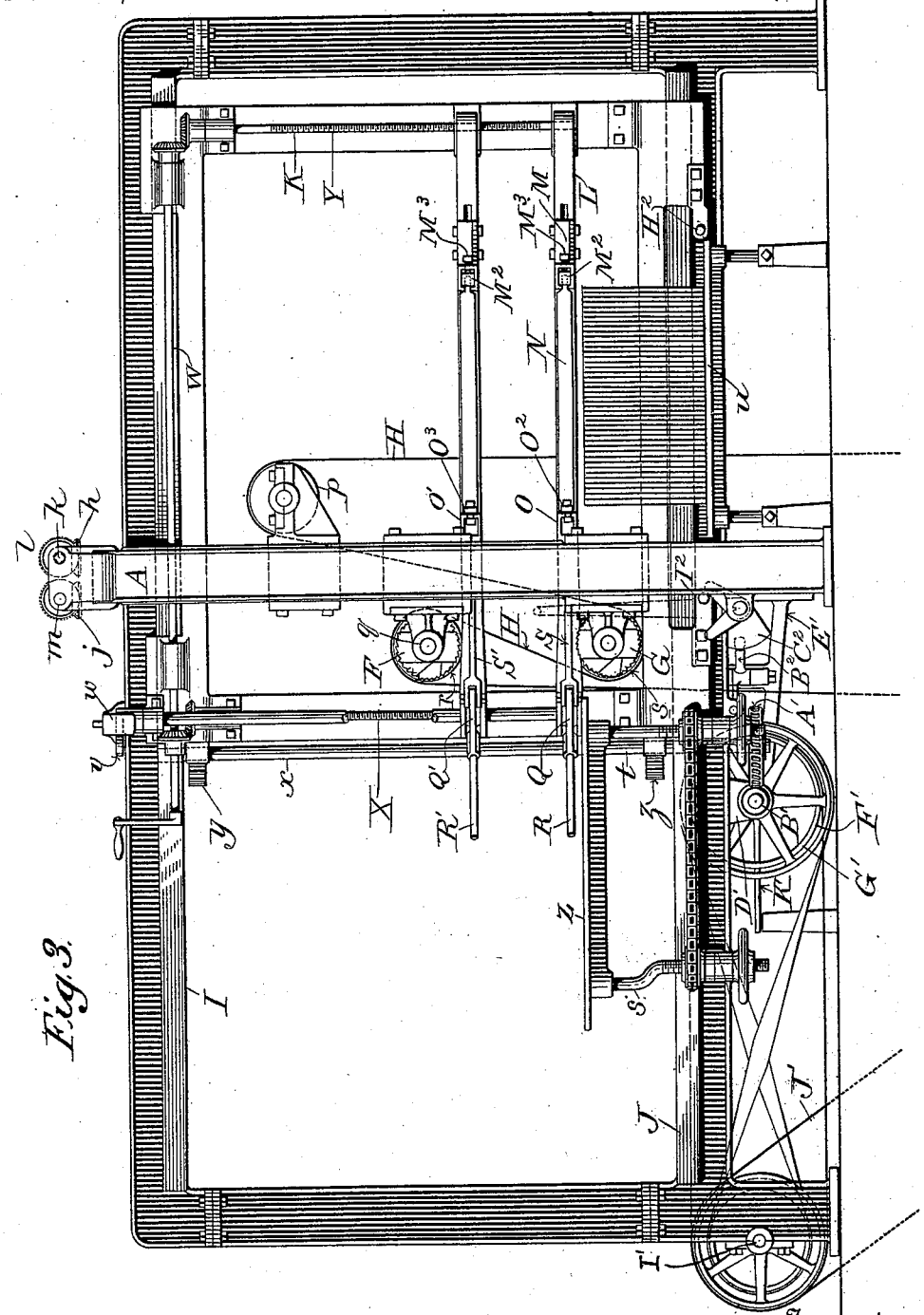

(No Model.) 6 Sheets—Sheet 4.
R. SCHLEICHER.
WOODWORKING MACHINE.
No. 569,940. Patented Oct. 20, 1896.
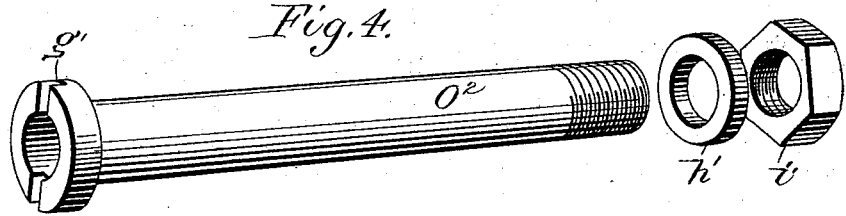
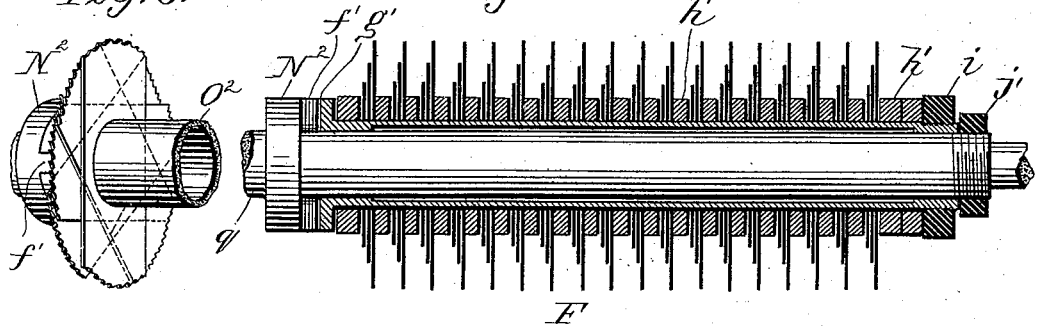
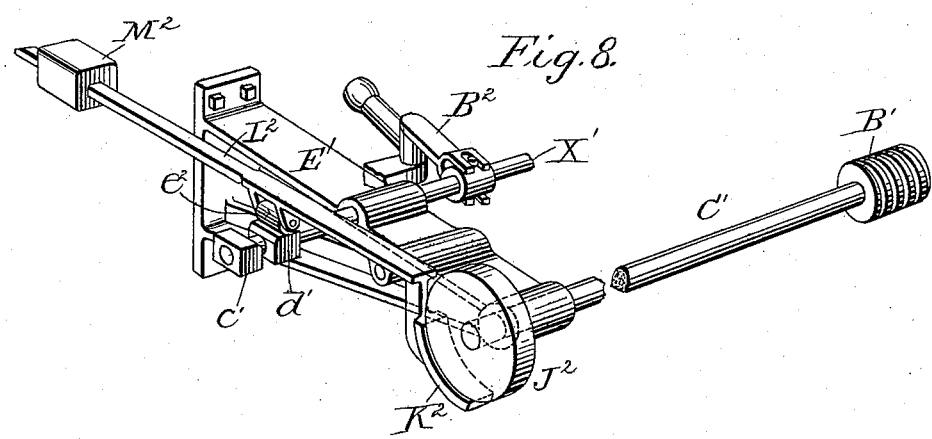
Witnesses:
C. C. Burdine
D. E. Burdine
Inventor:
Robert Schleicher,
by Dodge and Sons,
Attorneys.

(No Model.) 6 Sheets—Sheet 5.
R. SCHLEICHER.
WOODWORKING MACHINE.
No. 569,940. Patented Oct. 20, 1896.
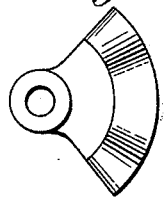
Fig. 9.
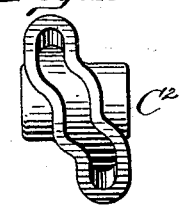
Fig. 10.
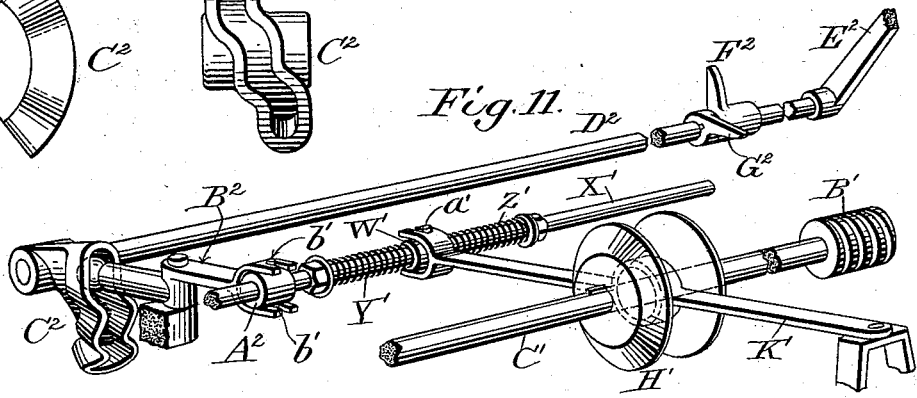
Fig. 11.
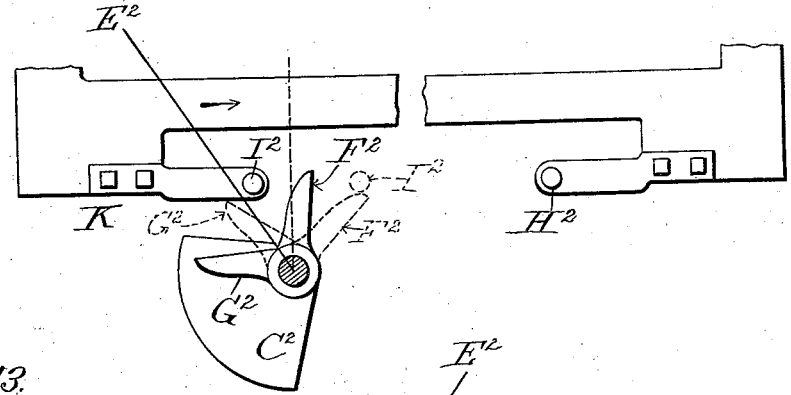
Fig. 12.
Fig. 13.
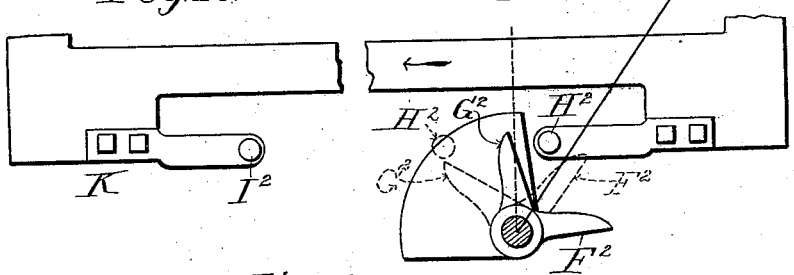
Fig. 14.
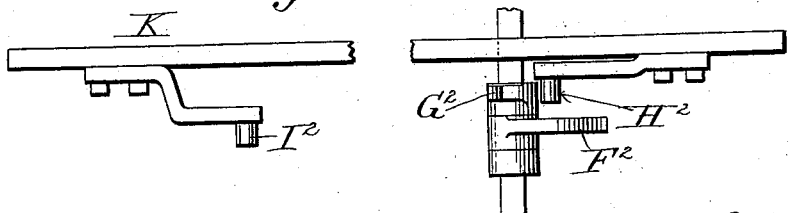
Witnesses:
W. C. Burdine.
D. E. Burdine.
Inventor:
Robert Schleicher,
by Dodge & Son,
Attorneys.
THE NORRIS PETERS CO., PHOTO-LITHO., WASHINGTON, D. C.

(No Model.) 6 Sheets—Sheet 6.

R. SCHLEICHER.
WOODWORKING MACHINE.

No. 569,940. Patented Oct. 20, 1896.

Attest:
A. C. Burdine
D. E. Burdine

Inventor:
Robert Schleicher,
by Dodge Sons,
Att'ys.

UNITED STATES PATENT OFFICE.

ROBERT SCHLEICHER, OF LOUISVILLE, KENTUCKY.

WOODWORKING-MACHINE.

SPECIFICATION forming part of Letters Patent No. 569,940, dated October 20, 1896.

Application filed January 13, 1896. Serial No. 575,298. (No model.)

*To all whom it may concern:*

Be it known that I, ROBERT SCHLEICHER, a citizen of the United States, residing at Louisville, in the county of Jefferson and State of Kentucky, have invented certain new and useful Improvements in Woodworking-Machines, of which the following is a specification.

My invention relates to box-machines, and is designed, primarily, for making the mortise and tenons on the ends of blanks used in the manufacture of boxes.

Figure 1:
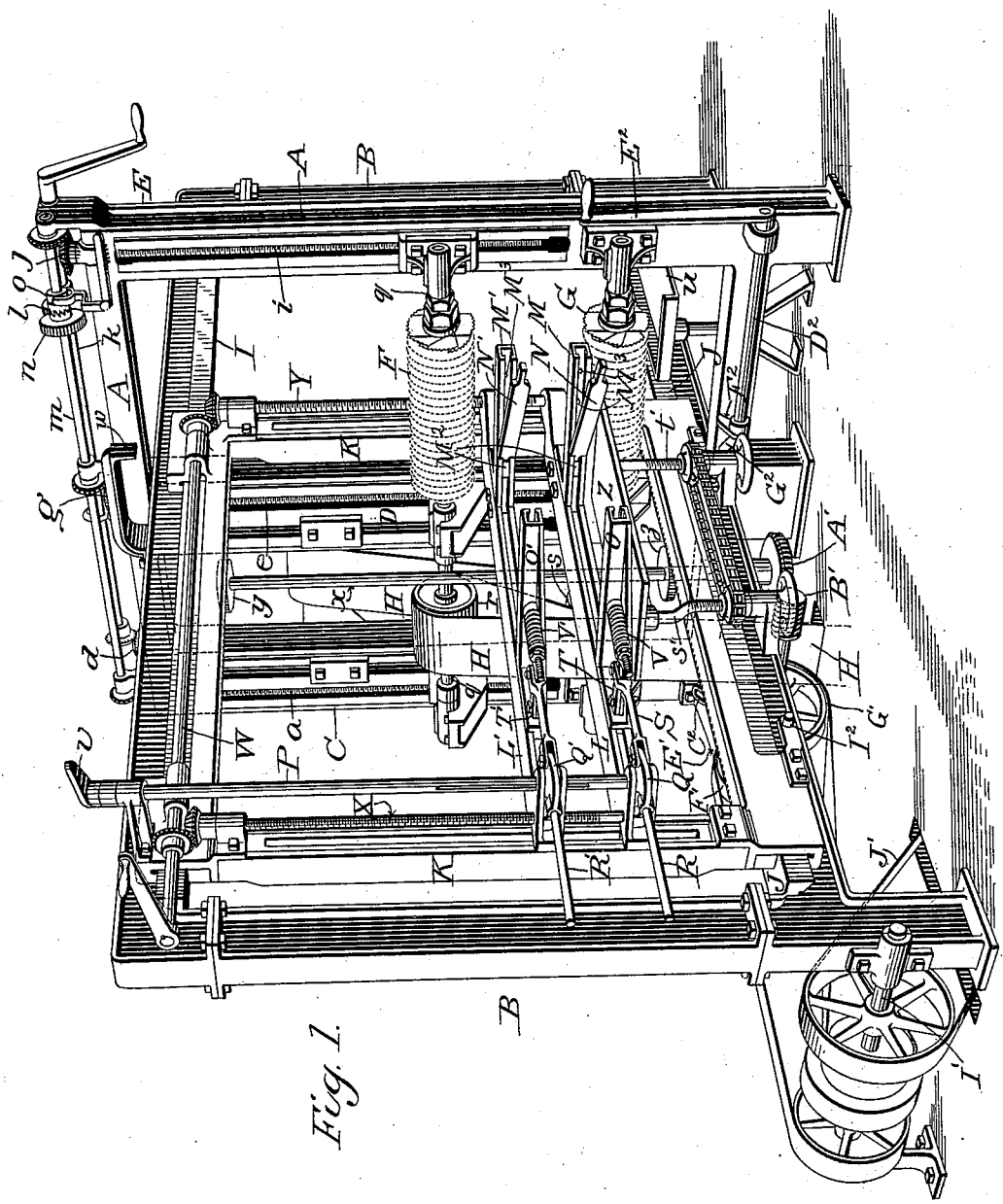
Figure 2:
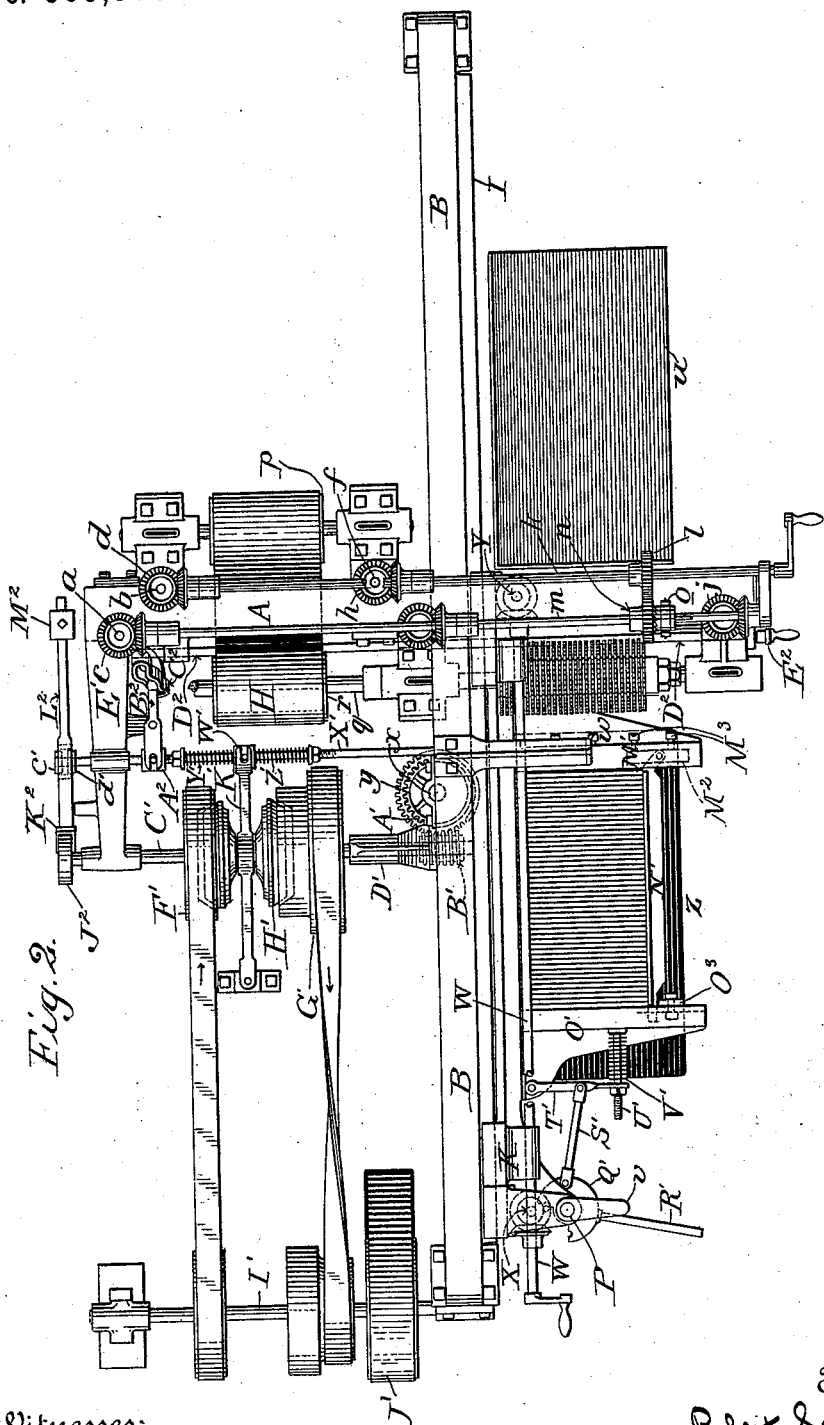
Figure 15:
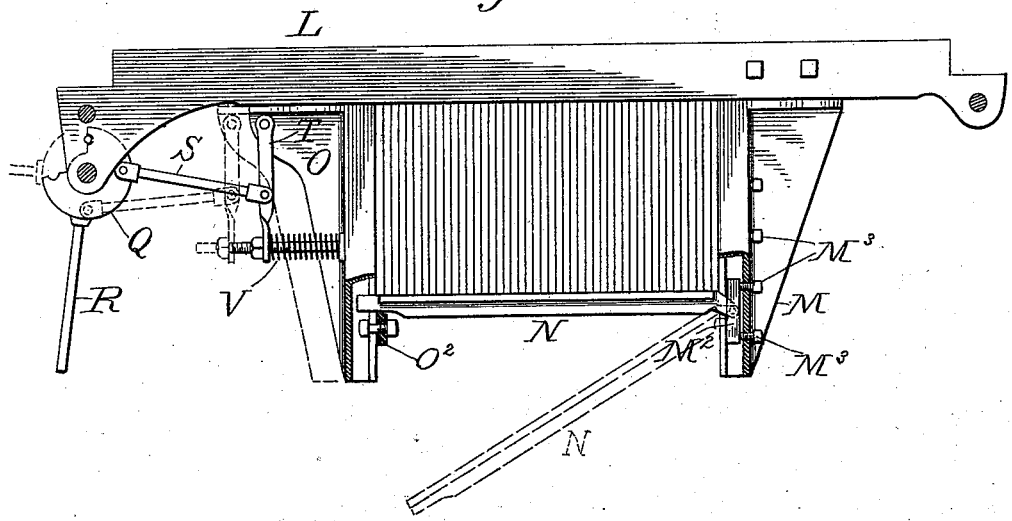

Referring to the annexed drawings, Figure 1 is a perspective view of the machine; Fig. 2, a top plan view; Fig. 3, a side elevation; Figs. 4, 5, 6, and 7, views illustrating the arrangements and means for holding the cutters or saws; Fig. 8, a perspective view of the brake mechanism; Figs. 9, 10, and 11, views illustrating the clutch-shifting mechanism; Figs. 12, 13, and 14, views illustrative of the relation of the carriage to the clutch mechanism; and Fig. 15, a top plan view, partly in section, of a portion of the work-clamping mechanism.

The object of my invention is to provide a means whereby locked-end blanks may be readily and cheaply made, and that with as little handling of the material as possible.

Broadly stated, the machine comprises a reciprocating carriage, means carried by said carriage for holding the blanks to be cut, means also carried by the carriage for discharging the finished blanks, and mechanism for automatically stopping the carriage at the end of its travel in either direction.

The stationary frame of the machine comprises the two sections A and B, placed at right angles to each other. Section A carries or supports the saws or cutters and the belting for driving the same, while the section B forms a support or way for the reciprocating carriage and its attendant parts. The section A is formed with three columns C, D, and E. In the column C there are mounted two upright screws $a$ and $b$, each provided on its upper end with a bevel-gear $c$ and $d$. The column D has also two rotatable screws $e$ and $f$, mounted therein, likewise provided at their upper ends with beveled gears $g$ and $h$. The column E is provided with a single screw $i$, provided with a bevel-gear $j$.

Mounted upon the top of section A in line with the bevel-gears $d$ and $h$ is a shaft $k$, provided with bevel-gears adapted to mesh with $d$ and $h$, a gear-wheel $l$, and a crank at its outer end. A second shaft $m$ is placed upon the section B, parallel to the shaft K, and provided with beveled gears designed to mesh with the gears $c$, $g$, and $j$, respectively. An idler-gear $n$ is placed upon the shaft and takes into the gear $l$ upon shaft K. A clutch $o$, mounted upon a permanent key upon shaft $m$, takes into the gear $n$. A handle for throwing this clutch into and out of action will be provided.

Each of the screws or screw-shafts above referred to supports or carries a journal-box, which is guided in ways formed in the upright columns. The screw-shafts $b$ and $f$ support journals, which carry an idler shaft and pulley $p$. The screws $a$, $e$, and $i$ each supports a journal, in which is mounted a shaft or axle $q$, upon which is rigidly fixed a pulley $r$ and the upper cutter or saw F. The lower cutter G and the pulley $s$, Fig. 3, are mounted upon a shaft or axle fixed in its relation to the frame. A belt H passes up over the idler-pulley $p$, down under the pulley $s$, up over the pulley $r$, and thence back to the pulley from whence it obtains its power and motion. In the accompanying drawings it is illustrated as being driven from below the floor upon which the machine is mounted. This one belt drives both of the cutters, and the manner in which it is passed around the pulleys rotates the cutters in opposite directions. Should the belt be too loose, it is only necessary to rotate the shaft $k$ and elevate the idler shaft and pulley. If, for the reason of working on longer or shorter stock, it should be necessary to elevate or lower the cutter F, the sliding clutch $o$ is thrown into engagement with the gear $n$ and the shaft $k$ rotated. This will cause a rotation of the shaft $m$ in a direction opposite to that of shaft $k$, and if the cutter is elevated the idler pulley and shaft $p$ will be lowered to a corresponding degree, and thus the proper tension upon the belt H is maintained. Lowering of the adjustable cutter will cause a like elevation of the idler-pulley, and, as before, the tension on belt H is kept at the desired degree.

The section A of the frame is provided with two horizontal guides or ways I and J, upon which is mounted and travels a carriage K. This carriage is provided with means for clamping the material to be operated upon, passing the same between the cutters, and then automatically discharging it. The carriage is rectangular in form, the horizontal members taking on the guides or ways I and J, while the upright members are grooved or channeled to form ways or guides for the adjustable clamping member. The lower or stationary clamping member comprises a channeled or grooved bar L, extending horizontally across the carriage near its lower side and in a plane slightly above the upper edge of the lower cutter G. Rigidly secured to said bar and extending therefrom at right angles is a slotted or grooved jaw M. In the way formed in said jaw M, I mount a sliding block or shoe $M^2$, to which is pivoted a lever or arm N. Suitable screws $M^3$ pass through the back of the jaw M and serve to clamp the shoe $M^2$ in any desired position. The outer or free end of the lever N is reduced and is designed to enter a groove or slot formed in the movable jaw O. A stop $O^2$ is adjustably mounted in the slot in said jaw O, and serves to hold the lever N in place when said lever is swung around against the material being worked upon and the jaw O brought to the position shown in Figs. 2 and 16. The inner end of this movable jaw O is provided with a shoe or extension which is mounted and free to move in the channel or way in the bar L. An upright rock-shaft P is mounted in the outer end of the bar L and an extension or arm projecting from the upper corner of the carriage. Upon its lower end is splined a segmental plate Q, provided with a handle R and connected to the jaw O through the levers S and T and the stud or arm U. Lever T is pivoted to the shoe of jaw O, and its outer slotted end embraces the stud U and bears against a coiled spring V, mounted thereon, the parts being held in position by a nut screwed upon the stud. The lever S is pivoted to the lever T, a little to one side of its center, that is, nearer to its outer end. The other end of said lever S is pivoted to the segmental plate Q at such a point that when the jaw O is in its clamping position the pivots of the ends of lever S and the center of the rock-shaft P will be out of line, as clearly indicated in Fig. 2. The segmental plate Q has but a limited movement, simply sufficient to move the jaw O to and from its clamping position. A pin or stud projecting from the bar L limits the movement of said plate Q in either direction. The position indicated in Fig. 1 shows the jaws in their unclamped position, while Fig. 2 shows them as they are when clamping the material to be operated upon. The upper clamping member is movable vertically toward and from the lower clamping member, and comprises the grooved or channeled bar L', the grooved jaw M', the swinging lever N', and the movable jaw O'. The arm or lever N' is mounted in the jaw M' in a manner similar to the lever N, and an adjustable stop $O^3$ is also mounted in the jaw O'. The jaw O' is connected to a segmental plate Q' through the levers S' and T' and the stud or arm U' and spring V'. A handle R' is also secured to the segmental plate O'. The parts of this movable member are duplicates of the lower clamping member. Secured to the upper front face of the carriage is a horizontal shaft W, provided with a crank at one end and with two bevel-gears, which mesh with similar gears on the vertical screws X and Y. These screws pass down through and support the movable clamping member, and by turning the shaft W the said member may be either raised or lowered, as desired.

Z indicates a table or support adjustably secured to the frame beneath the clamping members. It is supported upon two screw-shafts $s'$ and $t'$, provided with sprocket-wheels, around which a chain passes. By turning either screw, both of which are provided with hand-wheels at their lower ends, the other will be rotated to a similar degree and the table uniformly elevated or lowered. A table $u$ is placed upon the floor on the opposite side of the cutters and in line with the table Z. The table Z serves as a support for the blanks before they are clamped, while the table $u$ receives the finished blanks after the clamping members have passed between the cutters and are released or unclamped. To effect this unclamping, the upright shaft P is provided upon its upper end with a tappet $v$, which is designed to come into contact with a laterally-extending arm or projection $w$, secured to the upper face of the frame-section B. The tappet is designed to come into contact with the arm $w$ when the carriage nears its limit of motion, and in so doing the shaft P is turned and the movable clamping-jaws O O' and their attendant parts brought into the position indicated in Figs. 1 and 3.

Reciprocating motion is imparted to the carriage through the upright shaft $x$, having its journals or bearings in the horizontal members of frame B. It is provided near its upper and lower ends with pinions $y$ and $z$, adapted to take into racks formed on the rear face of the horizontal members of the carriage K. To the lower end of shaft $x$ is secured a worm-wheel A', with which meshes a worm B', secured upon a shaft C'. This shaft C' is suitably supported by a hanger D' at its inner end, while its outer end is journaled in an arm E', extending laterally from the frame-section A. Upon the shaft C' are two loose pulleys F' G', and between them is mounted a two-faced friction-shoe H', keyed to but longitudinally movable upon the shaft. Motion is imparted to the pulleys F" G' through suitable belting and pulleys upon a shaft I', said shaft deriving its motion from a belt J', driven by a prime motor.

K' indicates a shifter-bar for the friction-shoe H', one end of which is pivotally secured to a stand secured upon the floor. Its other end is forked and embraces a collar W', said collar having pins $a'$, taking into slots formed in the forked end of the bar. This collar W' is slidably mounted upon a rod X', said rod being so mounted upon the frame that it can be moved endwise. The collar W' is held between two coiled springs Y' Z', which encircle shaft X' and are held thereon by suitable nuts. A collar $A^2$ is securely fastened to shaft X', and is provided with pins $b'$, said pins entering into slots formed in the forked end of a lever $B^2$. This lever is journaled or pivoted upon a lateral extension of the arm E', and is provided with a rounded head upon its other end. This rounded end is designed to enter and work in a cam-piece $C^2$, rigidly secured upon a rock-shaft $D^2$, which latter extends across and is journaled upon the frame-section A. At its outer end it is provided with a handle or lever $E^2$. The relation of the lever and the cam-piece $C^2$ is such that when the lever is in a vertical position the rounded end of lever $B^2$ will occupy a central position in said cam or that indicated in Fig. 2. In this position the friction-shoe II' is not acting against either of the pulleys F' or G', and consequently the shaft C' remains at rest. When, however, the lever is thrown to the left or in the position indicated in Fig. 11, the friction-shoe, through the bar K', rod X', and lever $B^2$, will be pressed against the pulley G' and caused to rotate therewith. Motion is thus imparted to the carriage through the shaft C' and the upright shaft X. When the lever is thrown to the right of the vertical position, the pulley F' will be brought into action and the carriage caused to travel in a reverse direction. It will thus be seen that when the cam is in its intermediate position and the lever upright the carriage will remain at rest. It will be propelled forward when the lever is thrown to the left of a vertical position and the cam occupies its lowest position, and it will be caused to travel back when the lever is to the right of a vertical position and the cam in its most elevated position.

Automatic means are provided for shifting the rock-shaft and cam and throwing the friction-clutch out of action as the carriage nears its limit of movement in either direction. To this end there are mounted upon the rock-shaft $D^2$ two arms $F^2$ $G^2$, adapted to engage, respectively, with studs or projections $H^2$ and $I^2$, secured upon opposite ends of the carriage. As will be seen upon reference to Fig. 14, these studs are out of line, and thus only one stud can act against one arm.

In Fig. 12 the lever E is thrown to the left and the carriage K is traveling forward. The arm $F^2$ is then in a vertical position and the cam $C^2$ in its lowest position. As the carriage nears its limit of movement the lug $I^2$ engages the arm $F^2$, throws the lever $E^2$ to its vertical position, and thus turns the rock-shaft so that the cam assumes its intermediate position and the friction-clutch is thrown out of action. It now being desired to return the carriage, the lever $E^2$ is thrown to the right and the parts assume the position indicated in Fig. 13. As the carriage nears the limit of its return movement the lug $H^2$ engages the arm $G^2$ and causes it to assume the position indicated in dotted lines, the lever $E^2$ being again brought to a vertical position and the clutch disengaged. A brake is employed to quickly stop the carriage just as the friction-clutch is thrown out of action and the carriage nears its limit of movement. To the outer end of shaft C' there is secured a flat-faced wheel or pulley $J^2$, against which bears a leather-faced shoe $K^2$, mounted upon the end of a lever $L^2$, fulcrumed upon a projection formed upon the arm E'. To the outer end of the lever there is secured an adjustable weight $M^2$. Upon the outer end of the reciprocating rod X' there are placed two blocks $c'$ $d'$, having their upper contiguous edges cut away or beveled. These beveled portions form a seat for the reception of a roller $e'$ when the rod X' is brought to that position where the roller can drop down between them. This is the case when the parts are in the position indicated in Fig. 2. In other words, it takes place whenever the lever $E^2$ is in a vertical position and the friction-clutch thrown out of action. The movement of the cam-piece $C^2$ and the consequent reciprocation of the rod X' will cause the brake to be thrown out and into action, as the case may be. The construction or building up of the cutters is also of importance. The saws or knives are removable, and may be spaced any distance apart, as desired. The material operated upon is not always of the same width, nor is it always desired to make the mortise and tenons of the same dimensions. The shaft or arbor $q$ is provided with a collar $N^2$, having webs or ribs $f'$ $f'$ formed thereon. A sleeve $O^2$ is adapted to fit over the shaft, and is provided with notches or recesses $g'$ to engage the ribs $f'$. The cutter-blades are made in small separate pieces, each having a central opening, and designed to be mounted on the collar $O^2$. Suitable spacing-washers $h'$ will be employed in making up the cutter, and after the blades and washers are in place on the sleeve they will be securely fastened thereon by a nut $i'$. The sleeve is then placed on the arbor or shaft, and a nut $j'$ securely holds it thereon.

The journal-box forming the support for the end of shaft $q$ is so constructed that it may be readily and quickly removed therefrom in order that the sleeve $o^2$ may be removed for the purpose of rearranging or sharpening the cutters or for the purpose of substituting another sleeve with blades of a different or like character.

The parts being in the position indicated in Fig. 1 the blanks are placed upon the table Z, the arms N N' thrown around against the edges of said blanks, and the clamping-jaws O O' advanced against said blanks through the medium of the handles R R' and the intermediate connections. Should too many blanks be placed upon the table, the springs V V' will be compressed and the clamping-jaws and their attendant levers be relieved of any strain. After the work is clamped the lever E² is thrown to the left, thus turning the rock-shaft $q$ and its cam, shifting the arm B² and causing the rod X', through the shifter-bar K', to bring the friction-shoe H' into contact with pulley G'. Motion is thus imparted to the carriage through shaft C', shaft $x$, pinions $y$ $z$, and the rack on the carriage. As the rod X' is shifted longitudinally the roller $e$ on the brake-lever L² rides out of the groove between the blocks $d'$ $c'$ and relieves the wheel J² of the friction exerted thereon by the shoe K². As the carriage is caused to traverse the length of the machine the blanks pass between the cutters F and G, and the mortise and tenons are formed on the ends thereof. After the blanks have passed between the cutters and as the carriage nears its limit of movement the tappet $v$ comes into contact with the arm W and releases the finished blanks from the clamping members onto the table $u$. At the same time the stud I² on the carriage comes into contact with the arm F² on the rock-shaft D², causing said rock-shaft to turn and through its connected parts to bring the friction-clutch into its loose position. As this is done the brake mechanism is brought into action and further movement of the carriage is checked. The parts are then in the position indicated in Fig. 3. By throwing the lever to the right the carriage is caused to travel back to its original position ready to receive a fresh charge of blanks. When moving in this direction, the stud H² will come into contact with the lever or arm G² and again throw out the clutch mechanism and apply the brake. From this it will be seen that all that is necessary in using the machine is to clamp the blanks and start the carriage both on its advance and return movements. The rest of the actions are accomplished automatically.

Having thus described my invention, what I claim is—

1. In a woodworking-machine, the combination of the cutters; the reciprocating carriage; and a fixed and an adjustable clamping member, each comprising a fixed jaw; a lever pivoted in said jaw; a movable yielding jaw, provided with means for holding the free end of the pivoted lever and means for operating said movable jaw.

2. In a woodworking-machine in combination with the driving-shaft and the clutch mechanism mounted thereon; a pulley mounted on the outer end of the driving-shaft; a shifting-rod for the clutch mechanism, having two beveled blocks mounted thereon; and a weighted brake-lever pivoted to the frame of the machine and having a sleeve to operate on the driving-shaft pulley, said lever being actuated by the blocks on the shifting-rod.

3. In a woodworking-machine, the combination of the frame comprising two sections A and B rigidly secured to each other; of a fixed and adjustable cutter carried by the section A; mechanism for imparting rotary motion to said cutters; means for simultaneously adjusting the adjustable cutter and the cutter-driving mechanism; a reciprocating carriage mounted upon the section B; work-clamping mechanism mounted upon said carriage; means for vertically adjusting one member of said clamping mechanism; an adjustable table or support carried by the section B beneath the clamping mechanism; means for imparting motion to the reciprocating carriage; means for automatically stopping the travel of the carriage; and means for automatically releasing the clamping mechanism after it has passed between the cutters.

4. In combination with the rotary cutters and their driving mechanism; the reciprocating carriage; the work-clamping members mounted upon said carriage and adjustable one in relation to the other, each clamping member comprising a fixed jaw, an arm or lever pivoted in said jaw, provided with means for holding the free end of the arm or lever, a movable jaw, means, substantially such as described, for causing the movable jaw to approach the fixed jaw, and a spring interposed between said means and the fixed jaw.

5. In combination with the carriage, the bar L mounted thereon; a fixed jaw M provided with the arm or lever N; the movable jaw O; means carried by said jaw for holding the free end of the arm or lever N, and means for moving said jaw toward and from the fixed jaw.

6. In combination with the carriage; bar L mounted thereon; a fixed jaw M provided with arm or lever N; movable jaw O; means carried by said jaw for holding the free end of the arm or lever N, plate Q; connections between said plate and jaw O; upright shaft P secured to the plate; and handle R.

7. In combination with the carriage of the fixed bar L and the movable bar L'; rock-shaft P; work-clamping members mounted upon the bars L and L'; each comprising a fixed jaw, a swinging lever or arm connected to said jaw, a movable jaw, means carried by said jaw for holding the free end of the arm or lever N, a plate connected to the rock-shaft P, and connections between said plate and the movable jaw; and means for raising and lowering the bar L'.

In witness whereof I hereunto set my hand in the presence of two witnesses.

ROBERT SCHLEICHER.

Witnesses:
C. C. MENGEL, Jr.
A. G. REIS.